United States Patent [19]

Riegel

[11] Patent Number: 5,003,393
[45] Date of Patent: Mar. 26, 1991

[54] CONTROL SIGNAL GENERATOR FOR PROCESSING A VIDEO SIGNAL

[75] Inventor: Maximilian Riegel, Nünberg, Fed. Rep. of Germany

[73] Assignee: U.S. Philips Corporation, New York, N.Y.

[21] Appl. No.: 323,475

[22] Filed: Mar. 14, 1989

[30] Foreign Application Priority Data

Mar. 18, 1988 [DE] Fed. Rep. of Germany ....... 3809075

[51] Int. Cl.[5] .............................................. H04N 5/14
[52] U.S. Cl. .................................... 358/160; 358/139; 358/148
[58] Field of Search ........................ 358/139, 148, 160

[56] References Cited

U.S. PATENT DOCUMENTS

| | | | |
|---|---|---|---|
| 4,408,337 | 10/1983 | Cang | 377/44 |
| 4,625,241 | 11/1986 | Ohzeki | 358/148 |
| 4,631,586 | 12/1986 | Gennetten et al. | 358/148 |
| 4,825,285 | 4/1989 | Speidel et al. | 358/133 |
| 4,855,826 | 8/1989 | Wischermann et al. | 358/139 |
| 4,864,400 | 9/1989 | Kumada et al. | 358/148 |

Primary Examiner—John W. Shepperd
Assistant Examiner—Michael D. Parker
Attorney, Agent, or Firm—Emmanuel J. Lobato

[57] ABSTRACT

The described control signal generator for processing a video signal is characterized by an addressable memory (PR1) whose addresses are associated with equally long time intervals of a video picture. The binary coded amplitude is stored at an address of the memory (PR1), which amplitude is to be assumed by the control signal (SS) generated by the control signal generator in the associated time interval. A counting unit (Z) which is clocked by a counter clock pulse (T) successively generates the addresses corresponding to consecutive time intervals of a video picture and being applied to the address inputs of the addressable memory (PR1). The frequency of the counter clock pulse (T) is chosen to be such that all addresses associated with a video picture are traversed during the time length of a video picture. A feedback between the output of the addressable memory (PR1) and the counting unit (Z) sets the counting unit (Z) at the address of the last time interval of a video picture to the address of the first time interval of the next video picture.

5 Claims, 1 Drawing Sheet

CONTROL SIGNAL GENERATOR FOR PROCESSING A VIDEO SIGNAL

BACKGROUND OF THE INVENTION

The invention relates to a control signal generator for processing a video signal. Such a control signal generator can be used, for example for coding video pictures. In this case it forms part of a coder as described, for example in DE36 13 343 and corresponding U.S. Pat. No. 4,825,285.

A basic signal and television test signal generator is known from EP 00 34 956 and corresponding U.S. Pat. No. 4,468,337 in which the amplitudes of the basic and test signals are stored in an addressable memory. The memory is directly addressed by a first counter and indirectly by a second counter via a further memory in which addresses for the first memory are stored. The two counters are clocked with clock signals of different frequencies and essentially correspond to a line and pixel counter. The known arrangement can be synchronised by means of a synchronising signal with other arrangements of a similar construction.

It is an object of the invention to provide a control signal generator whose output signal can synchronise a video signal using field synchronisation pulses, while the phase of the field synchronising pulses relative to the associated video signal is arbitrary.

SUMMARY OF THE INVENTION

This object is solved by the following means:

(a) an addressable memory whose addresses are associated with equally long time intervals of a video picture, while the binary coded amplitude is stored at an address of the memory, which amplitude is to be assumed by a generated control signal in the associated time interval, (b) a counting unit clocked by a counter clock pulse, successively generating the addresses corresponding to consecutive time intervals of a video picture and being applied to the address inputs of the addressable memory, the frequency of the counter clock pulse being chosen to be such that all addresses of a video picture are traversed during the time length of a video picture, (c) a feedback between the output of the addressable memory and the counting unit, which feedback sets the counting unit at the address of the last time interval of a video picture to the address of the first time interval of the next video picture.

An embodiment of the invention will now be described in greater detail with reference to the accompanying drawing in which

DETAILED DESCRIPTION OF THE INVENTION

Figure 1:
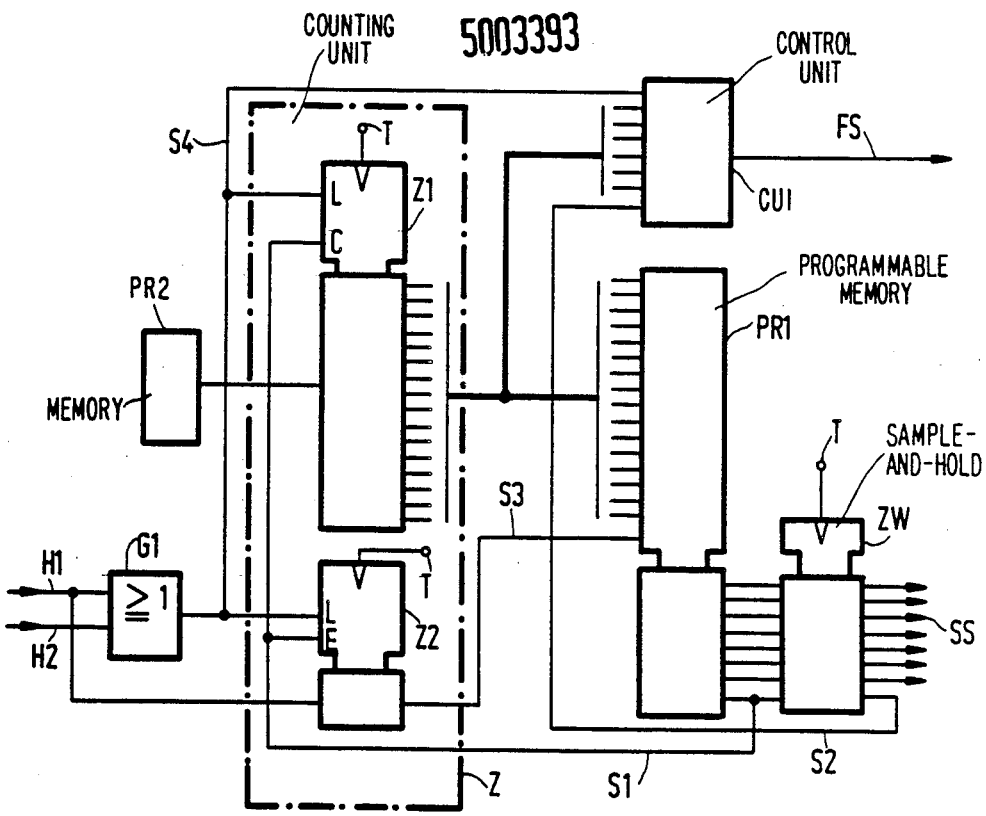
FIG. 1 shows the basic circuit diagram of a control signal generator according to the invention and FIG. 2 shows a control circuit.

The control signal generator of FIG. 1 is synchronised with a video signal comprising the information of a video frame in two successive video fields. In this respect the word video picture is used for video frames or video fields, in so far as this distinction is insignificant.

The control signal generator shown generates a control signal SS which is required for coding a video picture which is present. The specific contents of the control signal SS are dependent on the memory contents of a programmable memory PR1 whose address inputs are connected to the outputs of a counting unit Z comprising two counters Z1, Z2. Each position or output valve of the counters Z1, Z2 corresponds to an address for the programmed memory PR1.

The detailed representation of the control signal SS would require a further description of the special coding of video pictures. Since coding is not the subject of the problem herein described, the control signal SS will not be described in greater detail.

Dependent on the position of the counter Z1, Z2 a bit combination which is characteristic of this position appears at the outputs of the memory PR1, namely a binary coded amplitude of the control signal SS which amplitude is taken over by a sample-and-hold member ZW and which is available at its outputs during one pulse. The sample-and-hold member ZW and the counters Z1, Z2 are supplied with a counter clock pulse T.

Each position of the counter Z1 corresponds to a time interval between the start and the end of a field. The counter position 0 corresponds to the first time interval of a field and the position 50080 corresponds to the last interval because the counter Z1 is clocked with 2.5 MHz and because the control signal generator for coding a video signal is in accordance with the CCIR standard.

Due to the feedback of an output of the memory PR via a line S1 to the erasing input C of the counter Z1, the counter Z1 is reset from position 50080 to position 0, for the memory PR is programmed in such a way that a result pulse appears on the line S1 at the position 50080.

The state of the signal at the output of the one-bit counter Z2, thus the state of the signal on a line S3 indicates the number of a field. If the state is HIGH, it corresponds to the first field and if it is LOW, it corresponds to the second field. The pulse which resets the counter Z1 also ensures a change of state of the signal on the line S3, for this pulse enables the counter Z2 for one clock of the counter clock pulse T at the input E. The line S3 is also connected to an address input of the memory PR1. Due to counting of the fields, the bit combinations supplied from the outputs of the memory PR1 and from the output of the sample-and-hold member ZW may be different from field to field.

Lines H1, H2 are used for the field synchronising pulses. The line H1 is provided for synchronous pulses of the first field and the line H2 is provided for synchronous pulses of the second field. If no pulses occur on these lines, the control signal generator is not influenced and generates cyclically the control signal SS which is repeated with the duration of a period of a video frame. The field synchronising pulses may occur at an arbitrary instant within a field, provided that this instant remains nominally the same for each field. An OR-gate G1 ensures that a pulse appears on a line S4 for each field. These field synchronising pulses are applied to the charge or set inputs L of the counters Z1 and Z2. When a field synchronising pulse occurs, the counter Z1 is charged or set with the address stored in a memory PR2. This address indicates the number of time intervals between the start of a field and the occurence of a field synchronising pulse. By varying the address stored in the memory PR2 and by varying the program in the programmable memory PR1 the phase location of the control signal SS relative to the video signal to be processed can be arbitrarily chosen, independently of the position of the field synchronising pulses. If the synchronisation of the control signal generator with the video field synchronising pulses is perfect, the counter Z1 is charged with the address stored in the memory PR2 at the instant when it has automatically arrived at this address; the course of the counter Z1 thus remains uncorrected.

The video field synchronising pulses never occur simultaneously on the lines H1 and H2 because they are associated with different fields. Therefore, the counter Z2 is charged with a binary one when a synchronising pulse of the first occurs on the line H1 and with a binary zero when a synchronising pulse of the second field occurs on the line H2.

Some outputs of the stages of the counter Z1, the output of the gate G1 as well as an output of the sample-and-hold member ZW are also connected to inputs of a control unit CU1. The connection between the sample-and-hold member ZW and the control unit CU1, thus line S2, conveys the pulse synchronised with the counter clock pulse T, which pulse occurs in the signal SS only during the last time interval of a video field.

Figure 2:
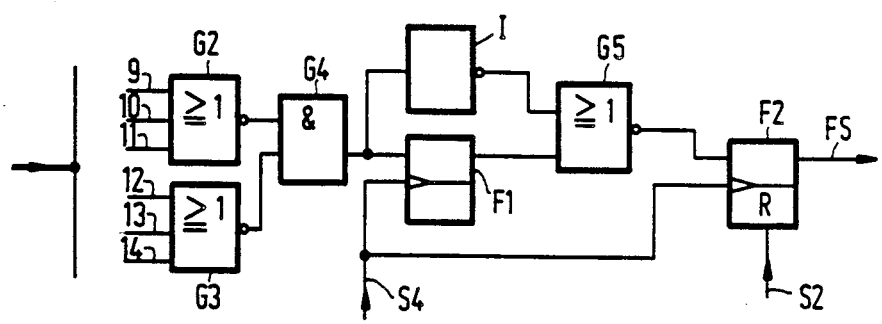

As shown in FIG. 2, the control unit PR1 includes a logic circuit comprising a plurality of gates G2, G3, G4 with which it is determined whether the counter Z1 is within a predetermined address interval or not. As is shown in FIG. 2, the outputs of the stages 9 to 14 of the counter Z1 are connected to the inputs of the logic circuit G2, G3, G4. If binary zeros are present at these inputs, a binary one is present at the output of the logic circuit G2, G3, G4, and in the other case a binary zero is present. If a one is present, a counter is in the interval between 0 and 1024.

If a field synchronising pulse on the line S4 does not occur within this predetermined address interval, this absence of coincidence is maintained by storing the binary zero which is present at the output of the gate G4 in a flip-flop F1. If the next field synchronising pulse again occurs within its tolerance limits—thus within the predetermined address interval—the zero in the flip-flop F1 is inverted by a gate G5 and taken over as a one in a flip-flop F2. The gate G5 is enabled for the relevant case by the inverted output signal of the logic circuit G2, G3, G4; and an inverter I takes over the inversion. The one in the flip-flop F2 which is passed on to an output line FS is the alarm signal which indicates the previous coarse offset between the field synchronising pulses on the lines H1 and H2 and the control signal generator. The flip-flop F2 is reset again by a pulse on the line S2 which is applied to its reset input R.

Subsequent measures, which are not further described in this Application, are then taken on the basis of the alarm signal.

I claim:

1. A control signal generator for processing a video signal, characterized by
    an addressable memory (PR1) whose addresses are associated with equally long time intervals of a video picture, while a binary coded amplitude is stored at an address of the memory (PR1), which amplitude is to be assumed by a generated control signal (SS) in the associated time interval,
    a counting unit (Z) clocked by a counter clock pulse (T), successively generating the addresses corresponding to consecutive time intervals of a video picture and being applied to the address inputs of the addressable memory (PR1), the frequency of the counter clock pulse (T) being chosen to be such that all addresses of a video picture are traversed during the time length of a video picture,
    a feedback (S1) between an output of the addressable memory (PR1) and the counting unit (Z), which feedback sets the counting unit (Z) at the address of the last time interval of a video picture to the address of the first time interval of the next video picture.

2. A control pulse generator as claimed in claim 1, characterized in that means (SP2, G1) are provided with which the counting unit (Z) is set to a predetermined address by means of field synchronising pulses (H1, H2).

3. A control pulse generator as claimed in claim 2, characterized in that a control unit (CU2) is provided which receives the addresses generated by the counting unit (Z), the field synchronising pulses and a pulse generated with the last time interval of a video picture in the control signal (SS) and in that the control unit (CU1) supplies an alarm signal (FS) when a field synchronising pulse does not occur within a predetermined address interval and when the next field synchronising pulse occurs within this address interval.

4. A control signal generator as claimed in claim 1, characterized in that in the case in which the video signal is split up into frames and each frame consists of two fields, the counting unit (Z) comprises a first counter (Z1) which generates the addresses for the time intervals within a field, and a second one-stage counter (Z2) for counting the fields of a frame, in that the first counter (Z1) is erased via the feedback (S1) and the second counter (Z2) is enabled for an edge of the counter clock pulse (T).

5. A control signal generator as claimed in claim 4, characterized in that for the purpose of synchronising the operation of the two counters (Z1, Z2) with a video signal to be processed, the first counter (Z1) is set to an address stored in a memory (PR2) when each field synchronising pulse occurs, while the second counter (Z2) is charged by each field synchronising pulse with the number of the field to be processed.

* * * * *